United States Patent
Ajima et al.

(10) Patent No.: US 9,143,065 B2
(45) Date of Patent: Sep. 22, 2015

(54) MOTOR DRIVE DEVICE

(75) Inventors: Toshiyuki Ajima, Tokyo (JP); Norikazu Matsuzaki, Hitachinaka (JP); Kentaro Ueno, Hitachinaka (JP); Masaru Sakuma, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 61 days.

(21) Appl. No.: 14/111,648

(22) PCT Filed: Apr. 25, 2011

(86) PCT No.: PCT/JP2011/060012
§ 371 (c)(1),
(2), (4) Date: Oct. 14, 2013

(87) PCT Pub. No.: WO2012/147142
PCT Pub. Date: Nov. 1, 2012

(65) Prior Publication Data
US 2014/0035493 A1   Feb. 6, 2014

(51) Int. Cl.
 *H02P 6/16* (2006.01)
 *H02P 21/14* (2006.01)
 *H02P 6/12* (2006.01)

(52) U.S. Cl.
CPC .. *H02P 6/16* (2013.01); *H02P 6/12* (2013.01); *H02P 21/146* (2013.01)

(58) Field of Classification Search
CPC ............ H02P 21/146; H02P 6/12; H02P 6/16
See application file for complete search history.

(56) References Cited

U.S. PATENT DOCUMENTS

| 6,615,152 B2* | 9/2003 | Fujimoto et al. ................. 702/94 |
| 7,746,023 B2* | 6/2010 | Ajima et al. ................... 318/700 |
| 2005/0248306 A1* | 11/2005 | Chen et al. ..................... 318/712 |
| 2006/0097676 A1* | 5/2006 | Katahira ....................... 318/432 |
| 2008/0052562 A1 | 2/2008 | Kameya et al. |
| 2008/0203962 A1* | 8/2008 | Maeda et al. .................. 318/721 |

FOREIGN PATENT DOCUMENTS

| JP | 2005-147733 A | 6/2005 | |
| JP | 2006-042419 A | 2/2006 | |
| JP | 2006-177750 A | * 7/2006 | ............. G01D 5/245 |
| JP | 2008-051559 A | 3/2008 | |
| JP | 2008-196937 A | 8/2008 | |

OTHER PUBLICATIONS

PCT International Search Report on application PCT/JP2011/060012 mailed Jul. 26, 2011; 1 page.

* cited by examiner

*Primary Examiner* — Kawing Chan
(74) *Attorney, Agent, or Firm* — Foley & Lardner LLP (57) ABSTRACT

A motor drive device inputs two detection signals from a rotation position sensor thereby to detect a rotation position, and controls a voltage to be applied to a motor according to the detected rotation position. The motor drive device has a control unit for outputting a first voltage in a first state in which the square sum of sampling values sampled from the two detection signals is a predetermined value, and outputting a second voltage in a second state in which the square sum is not the predetermined value.

9 Claims, 10 Drawing Sheets

CROSS-SECTION VIEW IN SHAFT DIRECTION

MOTOR DRIVE DEVICE

TECHNICAL FIELD

The present invention relates to a motor drive device capable of, even when a proper waveform and an improper waveform are contained in a detection signal from a rotation position sensor of a motor, controlling an output voltage according to a state of the motor.

BACKGROUND ART

A motor device using a motor keeps driving the motor according to a detection signal acquired from a rotation position sensor of the motor. On the other hand, when a detection signal has an abnormality, the motor device notifies the abnormality state to a user, thereby achieving a safe operation of the motor through rapid maintenance. Patent Literature 1 describes therein a technique for determining whether detection signals of two rotation position sensors match with an amplitude during normal time, and detecting an abnormality of the rotation position sensors based on the determination result. Patent Literature 2 describes therein a technique for, when an abnormality is detected in an output signal of any one of three-phase output rotation position sensors, keeping driving the motor by use of the two remaining output signals.

CITATION LIST

Patent Literature

PTL1: JP 2005-147733 A
PTL2: JP 2008-196937 A

SUMMARY OF INVENTION

Technical Problem

However, with the method described in Patent Literature 1, in the case of one rotation position sensor, it is difficult to determine whether an input signal changing in its amplitude along with rotation of the motor matches with an amplitude during normal time. That is, it is difficult to determine whether the change in amplitude is due to a change in rotation position or due to an abnormality of the rotation position sensor. Therefore, in the case of one rotation position sensor, its abnormality cannot be accurately detected.

On the other hand, in the case of Patent Literature 2, if at least two output signals among three output signals are not normal, it is difficult to accurately detect a rotation position of the motor by the rotation position sensors. Therefore, if a proper state and an improper state alternately appear in the waveforms of the two output signals, a rotation position can be accurately detected only in a period in which the waveforms of the output signals are in the proper state. That is, the rotation of the motor cannot be kept.

It is an object of the present invention to provide a motor drive device capable of keeping driving the motor based on two detection signals even when a proper state and an improper state alternately appear in the two detection signals of rotation position sensors according to a rotation stop or operation state of the motor.

Solution to Problem

A motor drive device according to the present invention samples two detection signals output from a rotation position sensor to calculate a rotation position, and controls a voltage to be applied to the motor according to the rotation position. In this case, the motor drive device according to the present invention applies a first voltage to the motor in a first state in which the square sum of the sampling values sampled from the two detection signals is a predetermined value, and applies a second voltage to the motor in a second state in which the square sum of the two detection signals is not the predetermined value.

Advantageous Effects of Invention

With the motor drive device according to the present invention, it is possible to restrict a stop state of the motor to the minimum even when a proper waveform and an improper waveform are contained in two detection signals.

The objects, structures and effects other than those described above will be more apparent from the following description of embodiments.

DESCRIPTION OF EMBODIMENTS

Embodiments according to the present invention will be described below with reference to the drawings. The embodiments according to the present invention are not limited to the exemplary forms described later, and may be variously modified within the scope of the technical spirit.

First Embodiment

Structure of Device

Figure 1:
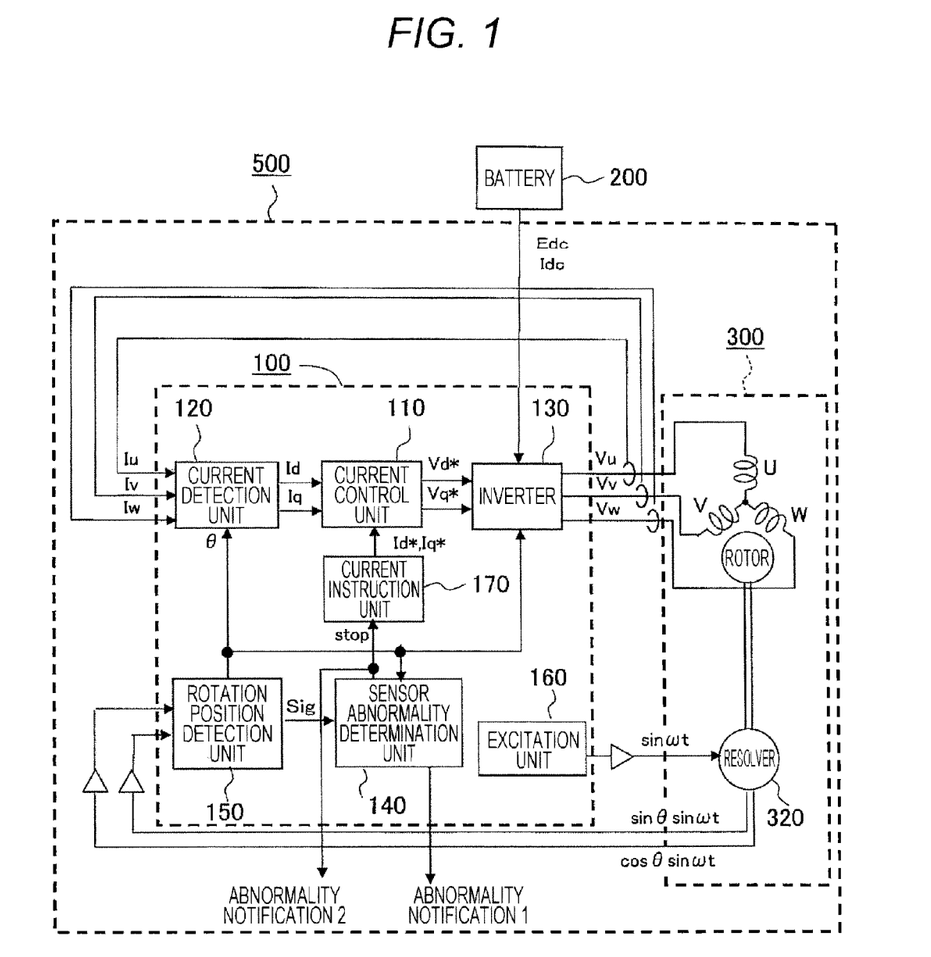
FIG. 1 is a diagram illustrating a structure of a motor device according to a first embodiment.

FIG. 1 illustrates an exemplary structure of a motor device 500 mounting a motor drive device 100 according to the embodiment thereon. The motor drive device 100 detects a rotation position of a motor 300 based on two detection signals output from a rotation position sensor 320 of the motor 300, and controls a drive voltage to be applied to the motor 300 according to the rotation position. The waveforms of the two detection signals change depending on a stop or operation state of the motor 300.

The motor drive device 100 according to the present embodiment controls a drive voltage to be output to the motor 300 based on the square sum of two-phase detection signals output from the rotation position sensor 320. Herein, when the square sum of the two-phase detection signals is a predetermined value, the motor drive device 100 outputs a predetermined voltage generated based on the detection signals to the motor 300. On the other hand, when the square sum is not the predetermined value, the motor drive device 100 outputs a predefined voltage to the motor 300.

The motor drive device 100 comprises a current control unit 110, a current detection unit 120, an inverter 130, a sensor abnormality determination unit 140, a rotation position detection unit 150, an excitation unit 160, and a current instruction unit 170.

A battery 200 is a DC voltage source of the motor drive device 100. A DC voltage Edc of the battery 200 is converted into a three-phase AC voltage with a variable voltage variable frequency by the inverter 130 of the motor drive device 100 thereby to be applied to the motor 300.

The motor 300 is a synchronization motor which is driven in its rotation due to supply of the three-phase AC voltage. The motor 300 is attached with the rotation position sensor 320 for detecting a rotation position.

The rotation position sensor 320 outputs the two-phase detection signals (Sin θ Sin ωt, Cos θ Sin ωt) modulated from an excitation signal (Sin ωt) supplied from the excitation unit 160 depending on a phase of an induced voltage appearing in the motor 300. The two-phase detection signals are used for controlling a phase of the three-phase AC voltage to be supplied to the motor 300. In the present embodiment, the rotation position sensor 320 employs a resolver configured of an iron core and a winding wire. The rotation position sensor 320 may employ a GMR (Giant Magneto Resistive) sensor, a sensor using a Hall effect, or the like.

The motor drive device 100 is provided with a function of current-controlling rotation (output) of the motor 300. The current detection unit 120 is one of the circuits achieving the function. Assuming three-phase motor current values (Iu, Iv, Iw) and a rotation angle θ to be applied to the motor 300 as input signals, the current detection unit 120 dq-converts the input signals thereby to generate current detection values (Id, Iq). The rotation angle θ is given from the rotation position detection unit 150.

The current control unit 110 generates voltage instruction signals (Vd*, Vq*) to be output to the inverter 130 such that the current detection values (Id, Iq) match with the current instruction values (Id*, Iq*). Herein, the current instruction values (Id*, Iq*) are given from the current instruction unit 170. The current instruction unit 170 generates the current instruction values (Id*, Iq*) according to target torque given from an upper-level controller.

The inverter 130 performs a processing of generating three-phase output voltage instructions (Vu*, Vv*, Vw*) based on the voltage instruction signals (Vd*, Vq*) and the rotation position θ, a processing of performing pulse width modulation (PWM) on the three-phase output voltage instructions thereby to generate a drive signal, and a processing of controlling to turn ON/OFF a semiconductor switch device by the drive signal. Outputs of the three-phase AC voltages (Vu, Vv, Vw) to be applied to the motor 300 are adjusted by the controlling.

The rotation position detection unit 150 calculates the rotation position θ of the motor 300 based on the two-phase detection signals (Sin θ Sin ωt, Cos θ Sin ωt) output from the rotation position sensor 320. In FIG. 1, an analog circuit (operational amplifier) is arranged before the rotation position detection unit 150. As described later, the operational amplifier is used for adjusting the amplitudes of the detection signals.

When the square sum of the two-phase detection signals sampled at a predetermined timing of the excitation signal (Sin ωt) is a predetermined value, the rotation position detection unit 150 updates the rotation position θ based on the two-phase detection signals. At this time, the rotation position detection unit 150 sets a status flag Sig at "0", for example.

On the other hand, when the square sum of the two-phase detection signals is not the predetermined value, the rotation position detection unit 150 outputs a defined rotation position θ without using the two detection signals. At this time, the rotation position detection unit 150 sets the status flag Sig at "1", for example. The detailed operations performed by the rotation position detection unit 150 will be described later.

The sensor abnormality determination unit 140 confirms the value of the status flag Sig at a timing synchronized with an excitation cycle of the excitation unit 160. Herein, when the value of the status flag Sig is "1", the sensor abnormality determination unit 140 increments the count value of a counter by 1. When the value of the status flag Sig is "0", the sensor abnormality determination unit 140 resets the count value of the counter.

When the count value "0" occurs subsequent to the count value "1" (or when a normal waveform and an abnormal waveform are alternately detected), the sensor abnormality determination unit 140 outputs an abnormality notification 1. In this case, the operation of the motor drive device 100 is continued.

To the contrary, when the count value is the predetermined value or more (or when the status flag Sig "1" is continuously detected), the sensor abnormality determination unit 140 outputs an abnormality notification 2. The abnormality notification 2 has a function as a stop signal (stop) for stopping the current instruction unit 170 from outputting the current instruction values (Id*, Iq*). When outputting the current instruction values (Id*, Iq*) is stopped, the motor drive device 100 abnormally stops.

The rotation position detection unit 150 according to the present embodiment assumes the phases (π/2, 3π/2, 5π/2, . . . ) in odd multiples of a quarter cycle (π/2) of the excitation signal (Sin ωt) as sampling timings of the two detection signals (Sin θ Sin ωt, Cos θ Sin ωt). The rotation position detection unit 150 calculates the square sum of the sampling values acquired at the timings. Assuming the amplitudes of the two-phase detect ion signals as S and C, respectively, the two detection signals can be expressed as S·Sin θ and C·Cos θ, respectively.

Figure 2:
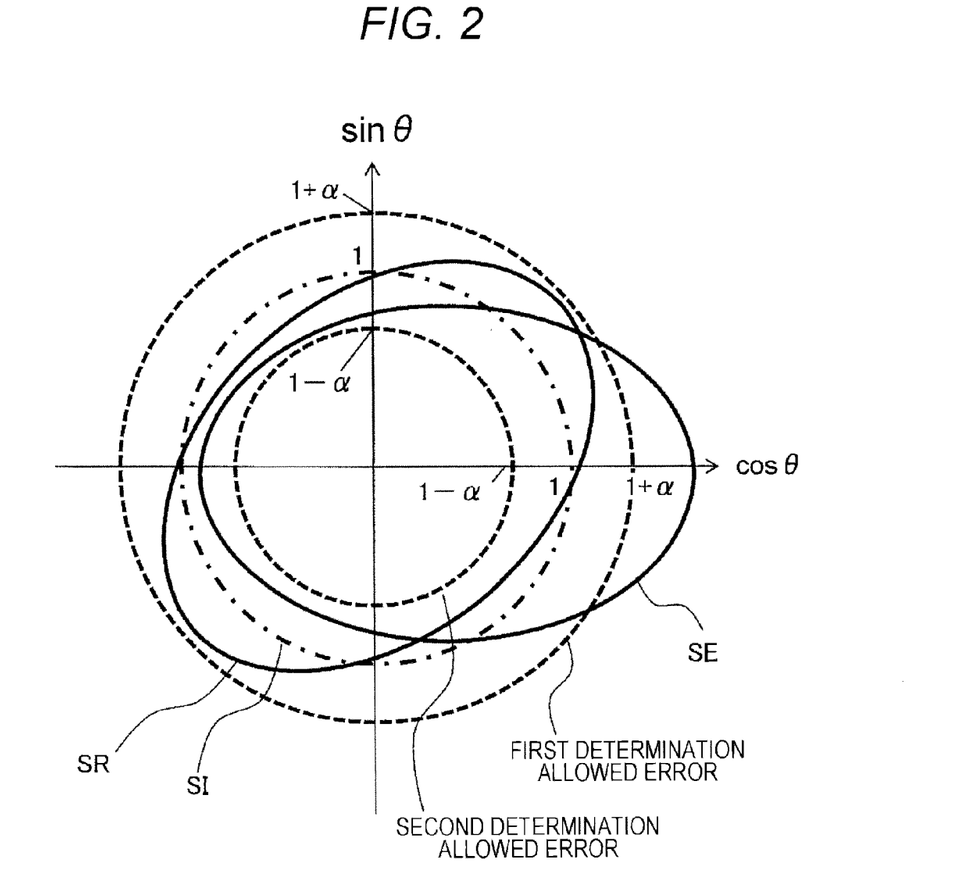
FIG. 2 is a diagram for explaining allowed errors of detection values.

When the two-phase detection signals are normalized such that the amplitudes S and C of the detection signals during normal time are "1", the square sum (SI) thereof indicates a circle with a radius of "1" as illustrated in a dashed line in FIG. 2. That is, $Sin^2 θ + Cos^2 θ = 1$ is obtained. Assuming a detection allowed error as ±α, an allowed range of the square sum (SI) of the detection signals is given at 1±α. A value of "1−α" which gives the maximum value of the allowed range is denoted as first determination allowed error below. A value of "1−α" which gives the minimum value of the allowed range is denoted as second determination allowed error below.

The rotation position detection unit 150 determines whether the square sum (SI) of the detection signals is within the allowed range. When the square sum (SI) is within the allowed range, the rotation position detection unit 150 determines that the rotation of the motor 300 is in the normal state. At this time, the value of the status flag Sig is set at "0."

On the other hand, when the square sum (SI) exceeds the allowed range, the rotation position detection unit 150 determines that the rotation of the motor 300 is in the abnormal state. At this time, the value of the status flag Sig is set at "1." The state indicates that the radius of the square sum of the detection signals is larger than the first detection allowed error (or $Sin^2\ \theta + Cos^2\ \theta > 1 + \alpha$) or smaller than the second detection allowed error (or $Sin^2\ \theta + Cos^2\ \theta < 1 - \alpha$).

When the square sum of the detection signals passes through the trajectory SR (FIG. 2), the value of the status flag Sig is "0" over the whole cycle of an electric angle. On the other hand, when the square sum of the detection signals passes through the trajectory SE (FIG. 2), the value of the status flag is "1" at part of one cycle of the electric angle, and the value is "0" at other part.

When the rotation position detection unit 150 is provided as part of a microcontroller, the amplitudes containing offset voltages of the two-phase detection signals need to be adjusted within a dynamic range of 0 to 5 V of an A/D converter provided in the microcontroller. The analog circuit (operational amplifier) or the like is used for adjusting the signals. In this way, the signals whose offset voltages and amplitudes are adjusted are given to the rotation position detection unit 150.

In the following, assuming the sampling values of the two-phase detection signals (Sin θ Sin ωt, Cos θ Sin ωt) as A and B, the amounts of their offset as Ca and Cb, and a detection allowed error as ±α', the following Equation is established among the values.

$$(A-Ca)^2+(B-Cb)^2=C\pm\alpha' \quad \text{(Equation 1)}$$

where c is a constant. The Equation is equivalent to the following equation.

$$Sin^2\ \theta+Cos^2\ \theta=1\pm\alpha \quad \text{(Equation 2)}$$

The calculations of the computation processing of converting Equation 1 to Equation 2 can be reduced by use of a mapping table or the like, and a required processing time can be reduced.

The detection allowed errors ±α and ±α' can be set by the maximum allowed error $\theta_e$ of the rotation position θ according to the required specification of the motor device 500. For example, when the output torque of the motor is constant and an error of the motor current is ±10%, the maximum allowed error $\theta_e$ is given at an electric angle of about ±25 degrees. In this case, the detection allowed errors ±α and ±α' can be set to correspond to the maximum allowed error $\theta_e$ (≈±25 degrees of electric angle). In the following description, the detection allowed errors α and α' are omitted in notation as needed.

When the motor device 500 controls a rotation speed of the motor 300, the motor device 500 calculates a motor rotation speed ωr by a temporal change in rotation position θ, and generates the voltage instruction signals (Vd*, Vq*) or current instruction values (Id*, Iq*) such that the motor rotation speed θr matches with an instruction speed given from an upper-level controller. Specifically, the current control unit 110 or the current instruction unit 170 in the motor device 500 generates corresponding signals or values, respectively.

When the motor device 500 controls the output torque of the motor 300, the motor device 500 uses a relational expression between the current detection values (Id, Iq) and the motor torque or a mapping table to generate the current instruction values (Id*, Iq*). Specifically, the current instruction unit 170 in the motor device 500 generates corresponding values.

[Waveform During Normal Rotation of Motor]

FIGS. 3(a) to 3(e) illustrate the waveforms of the two-phase detection signals and their associated signals appearing during normal rotation of the motor 300. In each graph, the horizontal axis indicates an actual rotation position θ, and the vertical axis indicates an amplitude normalized at ±1.

FIG. 3(a) indicates a waveform of a resolver excitation signal output from the excitation unit 160 to the rotation position sensor 320. The black circles in the Figure indicate sampling timings.

The two-phase detection signals used for calculating a rotation position (angle) θ are expressed by the resolver Sin signal (Sin θ) and the resolver Cos signal (Cos θ) as indicated in the solid lines in FIGS. 3(b) and 3(c). A tan signal is calculated from the two detection signals and its arc tangent is further calculated, thereby finding the rotation position θ.

The two-phase detection signals output from the rotation position sensor 320 are the waveforms of Sin θ Sin ωt and Cos θ Sin ωt amplitude-modulated from the resolver excitation signal (Sin ωt). FIGS. 3(b) and 3(c) illustrate the waveforms in a dotted line. In the present example, the sampling timings of the A/D converter in the microcontroller are given in odd multiples (π/2, 3π/2, 5π/2, . . . ) of a quarter cycle (π/2) of the resolver excitation signal Sin ωt (FIG. 3(a)).

In the present specification, in the sampling timings, a timing when the signal value of the resolver excitation signal Sin ωt is positive is called positive sampling timing, and a timing when the signal value of the resolver excitation signal Sin ωt is negative is called negative sampling timing.

Even when the sampling timing is offset from a peak phase of the resolver excitation signal, if the two-phase detection signals (Sin θ Sin ωt Cos θ Sin ωt) are sampled at the same time, the timing offset in arc tangent calculation can be cancelled.

For example, the sampling value of the resolver Sin signal is given at SA1, SB1, SA2, SB2, . . . . On the other hand, the sampling value of the resolver Cos signal is given at CA1, CB1, CA2, CB2, . . . .

At this time, the sampling values SA1 and CA1 are sampled at the same time. Similarly, SB1 and CB1 are sampled at the same time. Herein, if the allowed error is ignored, the square sum of the sampling values SA1 and CA1 meets $SA1^2+CA1^2=1$. In this case, the value of the status flag Sig is "0." The same goes for the square sum of the sampling values SB1 and CB1.

The solid line in FIG. 3(d) indicates a U-phase output voltage instruction Vu* (U-phase modulation wave) calculated in the inverter 130. The dotted line in FIG. 3(d) indicates a carrier signal Carrier for PWM modulation.

The solid line in FIG. 3(e) indicates a U-phase PWM modulation waveform generated by comparing the U-phase output voltage instruction Vu* indicated in FIG. 3(d) with the carrier signal Carrier for their magnitudes. The waveform is a drive Signal of the semiconductor switch device configuring the inverter 130.

An output voltage of the inverter 130 is half the voltage Edc of the battery 200. Other two phases or the V phase and the W phase are similarly given.

The solid line in FIG. 3(d) corresponds to an updated U-phase output voltage instruction Vu* at a peak timing of the carrier signal Carrier. The U-phase output voltage instruction Vu2* corresponding to the dotted line in FIG. 3(d) indicates an updated U-phase output voltage instruction at both the peak timing and the bottom timing of the carrier signal Carrier.

The U-phase output voltage instruction may be Vu or Vu2*. In any case, the output voltages of the motor drive device 100 are equivalent.

[Waveform During Abnormal Rotation of Motor]

FIGS. 4(a) to 4(e) illustrate the two-phase detection signals and their associated signals appearing when an abnormality is contained in the rotation of the motor 300. In each graph, the horizontal axis indicates an actual rotation position θ, and the vertical axis indicates an amplitude normalized at ±1.

The graphs illustrated in FIGS. 4(a) to 4(e) correspond to the graphs illustrated in FIGS. 3(a) to 3(e), respectively. A difference between FIG. 3 and FIG. 4 lies in that a state meeting $\sin^2 \theta + \cos^2 \theta = 1$ and a state not meeting the same alternately appear in the two-phase detection signals output from the rotation position sensor 320. FIG. 4 illustrates that an event in which the sensor abnormality determination unit 140 outputs the abnormality notification 1 appears in the two-phase detection signals.

In the Figures, a waveform abnormality appears on the side of the resolver Sin signal (Sin θ Sin ωt) indicated in the dotted line of FIG. 4(b). For the waveform abnormality in FIG. 4(b), a negative waveform of the resolver excitation signal Sin ωt is clamped at a smaller value relative to a normal amplitude. The waveform is equivalent to a diode-clamped waveform. The event is likely to occur when a wiring line extending from the rotation position sensor 320 to the rotation position detection unit 150 contacts a ground line or power supply line via a resistor or the like, when a failure occurs in the operational amplifier of the analog circuit (detection circuit) for signal adjustment, or the like.

The resolver Sin signal (Sin θ) and the resolver Cos signal (Cos θ) indicated in the solid lines in FIGS. 4(b) and 4(c) are used for calculating a rotation position (angle) θ. In the case of FIG. 4(b), the waveforms on the phase side of the negative signal values of the resolver excitation signal are all clamped at predetermined values.

A period in which an actual rotation position θ is between 0 and 180 degrees will be considered herein. In the period, a positive sampling timing gives a timing suitable for calculating the rotation position θ. The sampling values of the resolver signal (Sin θ) at the timing are SA1, SA2, . . . . In this case, $SAi^2 + CAi^2 = 1$ is met.

On the other hand, in the period, a negative sampling timing gives a timing not suitable for calculating the rotation position θ. The sampling values of the resolver Sin signal (Sin θ) at the timing are SB1, SB2, . . . . In this case, $SBj^2 + CBj^2 \neq 1$ is met.

A period in which an actual rotation position θ is between 180 and 360 degrees will be considered below. In the period, contrary to the period in which the phase is between 0 and 180 degrees, a positive sampling timing gives a timing not suitable for calculating the rotation position θ. The sampling values of the resolver Sin signal (Sin θ) at the timing are SA7, SA8, . . . . In this case, $SA7^2 + CA7^2 \neq 1$ is met.

On the other hand, in the period, a negative sampling timing gives a timing suitable for calculating the rotation position θ. The sampling values of the resolver Sin signal (Sin θ) at the timing are SB6, SB7, . . . . In this case, $SB6^2 + CB6^2 = 1$ is met.

When the square sum of the sampling values of the two-phase detection signals is not 1, the rotation position detection unit 150 according to the present embodiment keeps driving the motor 300 without the use of the sampling values. That is, the rotation position detection unit 150 uses only the sampling values at the positive sampling timings in the period in which an actual rotation position θ is between 0 and 180 degrees, and uses only the sampling values at the negative sampling timings in the period in which an actual rotation position θ is between 180 and 360 degrees.

That is, when a rotation position θ is between 0 and 180 degrees, the rotation position detection unit 150 uses the values sampled at a positive sampling timing for calculating the rotation position θ at each sampling timing.

Similarly, when a rotation position θ is between 180 and 360 degrees, the rotation position detection unit 150 uses the values sampled at a negative sampling timing for calculating the rotation position θ at each sampling timing. The calculation processing is performed in the rotation position detection unit 150 when the square sum of the sampling values at each sampling timing alternately takes 1 and non-1 (or 0).

The calculation processing is performed so that the U-phase output voltage instruction Vu* illustrated in FIG. 4(d) is correctly updated. Consequently, the U-phase PWM signal illustrated in FIG. 4(e) is obtained and a predefined output voltage is obtained for the motor drive device 100.

As described above, when the detection waveforms illustrated in FIGS. 4(b) and 4(c) are output from the rotation position sensor 320, the rotation position detection unit 150 repeatedly detects the state with $\sin^2 \theta + \cos^2 \theta = 1$ and the state with $\sin^2 \theta + \cos^2 \theta \neq 1$. Therefore, the rotation position detection unit 150 outputs the alternate values "0" and "1" of the status flag Sig to the sensor abnormality determination unit 140.

In this case, the count value of an internal counter of the sensor abnormality determination unit 140 takes a maximum value of 1. At this time, the sensor abnormality determination unit 140 outputs the abnormality notification 1.

To the contrary, when the state with $\sin^2 \theta + \cos^2 \theta \neq 1$ continues, the count value of the internal counter of the sensor abnormality determination unit 140 increases to a larger value than 1. When the count value exceeds a predetermined threshold (such as "1"), the sensor abnormality determination unit 140 outputs an abnormality notification 2. At the same time, the sensor abnormality determination unit 140 outputs a stop signal (stop) for creating a stop current instruction, and stops driving the rotation of the motor 300.

[Variant]

In FIG. 1, the abnormality notification 2 is used also for the stop signal (stop), and may be output as an individual signal.

There has been described above that a waveform at a negative sampling timing is clamed, but a waveform at a positive sampling timing may be clamped.

In the above description, only when "1" and "0" of the status flag Sig alternately appear, the abnormality notification 1 is output, and until the count value of the sensor abnormality determination unit 140 exceeds the threshold, no abnormality notification is output. However, when the count value is not 0 and is equal to or less than the threshold, the abnormality notification 1 may keep being output. The function is mounted so that the state in which a rotation abnormality of the motor remains can be notified to the outside.

The U-phase output voltage instruction may be updated only at the peak timing (Vu*) of the carrier signal Carrier, or at both the peak timing and the bottom timing of the carrier signal Carrier.

Figure 3:
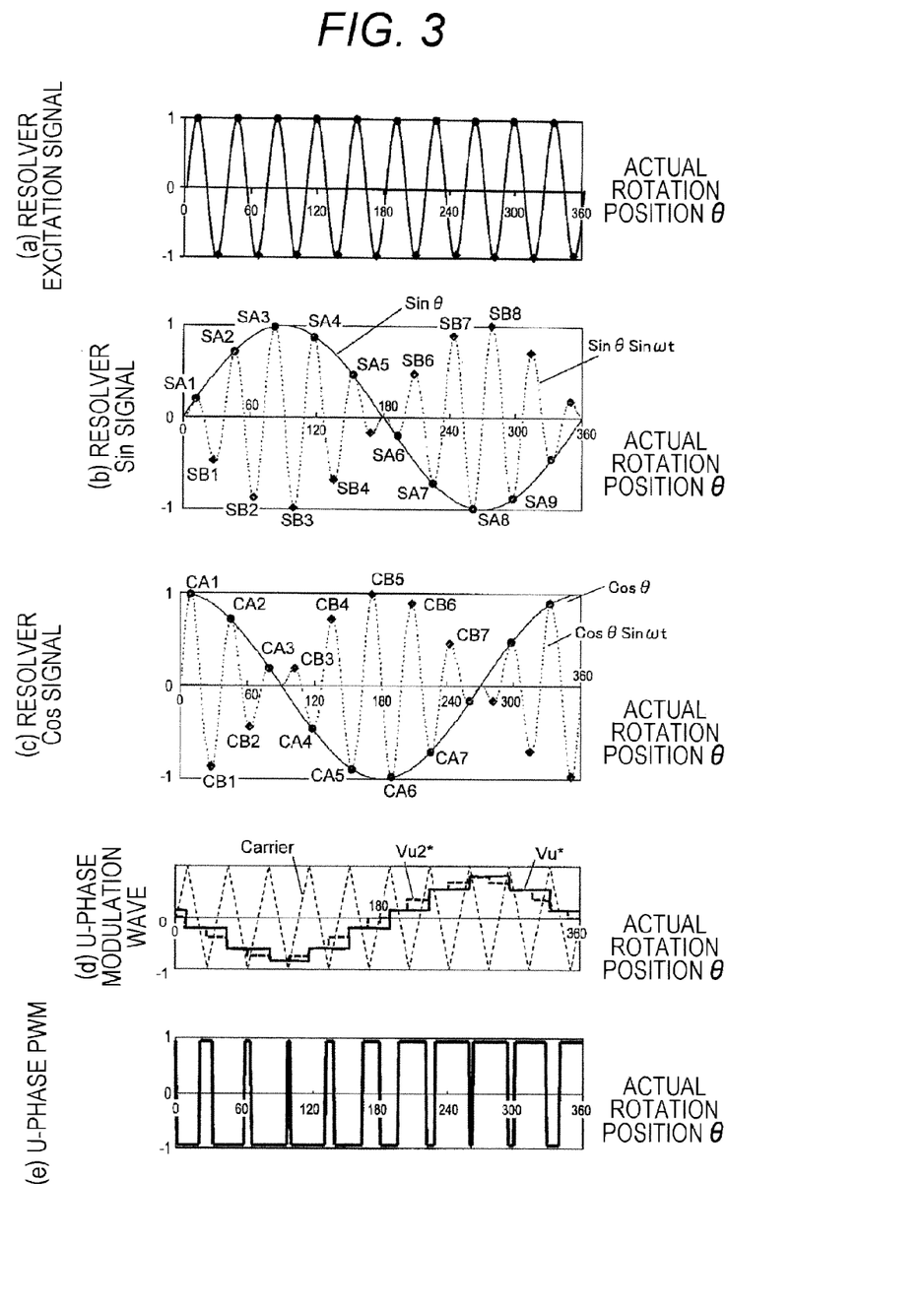
FIGS. 3(a) to 3(e) are diagrams illustrating exemplary waveforms of detection signals in a proper state.
Figure 4:
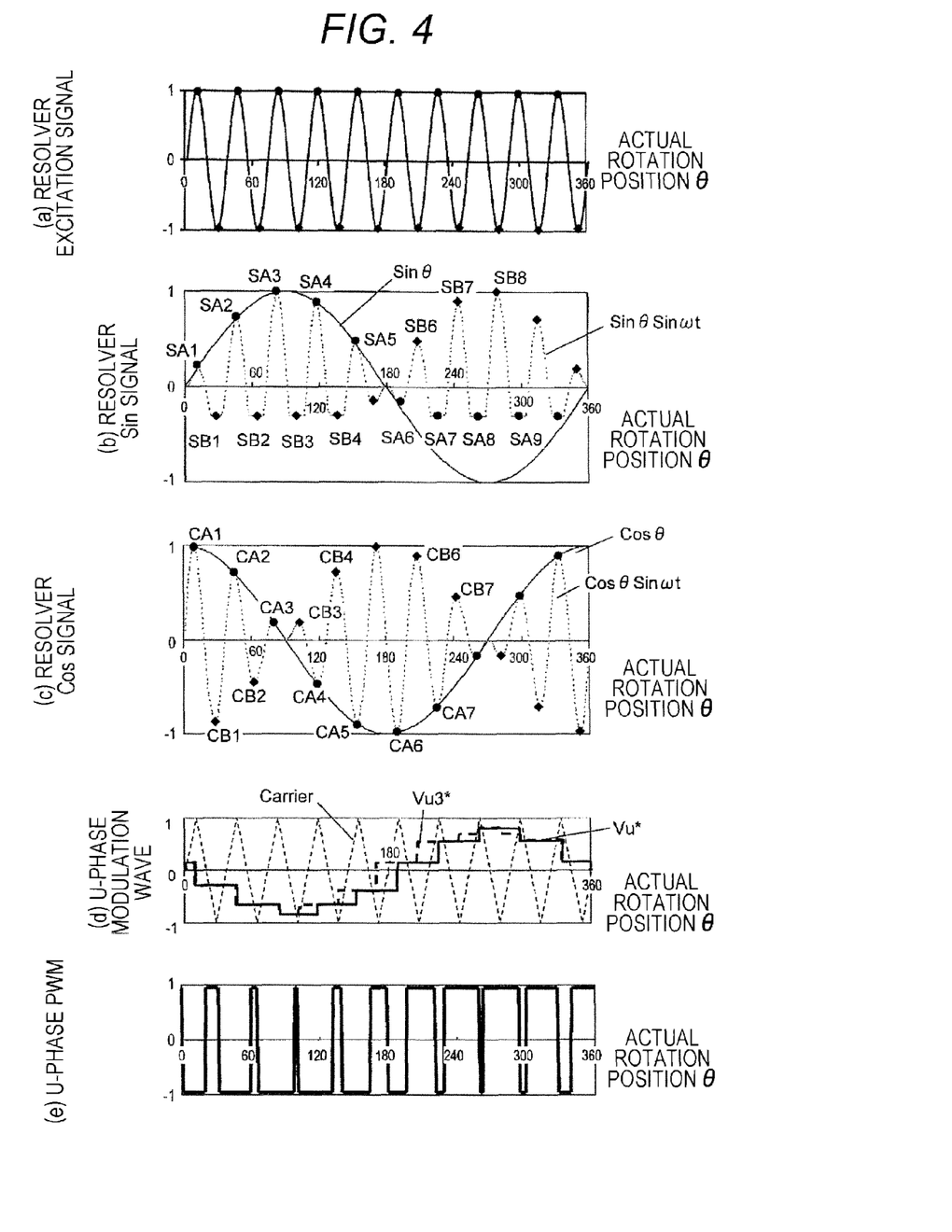
FIGS. 4(a) to 4(e) are diagrams illustrating exemplary waveforms of detection signals containing an improper state.

In FIG. 3 and FIG. 4, both the excitation frequency and the carrier frequency are roughly denoted relative to the output basic frequency for convenient description. Naturally, the excitation frequency and the carrier frequency are set as high as the motor can be driven without any failure.

In the present embodiment, there has been described the method for performing the sampling twice in one cycle of the resolver excitation signal, but the sampling may be performed twice in an integral multiple of the cycle of the resolver excitation signal. In the case of the detection waveform of FIG. 4(b), when two detection signals are sampled at intervals of one cycle ($\pi/2$, $5\pi/2$, $9\pi/2$, . . . ) relative to a quarter cycle ($\pi/2$) of the resolver excitation signal Sin ωt, a proper state (status flag Sig=1) cannot be detected in the period in which an actual rotation position θ is between 180 and 360 degrees. This state cannot be solved even if the frequency of the excitation signal is increased. Therefore, as described in the above embodiment, it is suitable that the two-phase detection signals are sampled at the timings in odd multiples ($\pi/2, 3\pi/2, 5\pi/2, \ldots$) of a quarter cycle ($\pi/2$) of the resolver excitation signal Sin ωt.

[Summary]

As described above, when the two detection signals from the rotation position sensor 320 have a relationship of $\sin^2 \theta + \cos^2 \theta \neq 1$, the motor drive device 100 according to the present embodiment does not use the signals, and uses the detection signals meeting $\sin^2 \theta + \cos^2 \theta = 1$ thereby to generate a drive voltage of the motor 300. Therefore, even when an abnormality is found in the waveforms of the detection signals (for example, when a waveform at a negative sampling timing is clamped), the motor 300 can keep being driven without stopping voltage supply thereto. Thus, a robust property can be enhanced against a mixture of disturbance into the two-phase detection signals.

The motor drive device 100 according to the present embodiment can make a notification of the abnormality state 1 capable of continuous operation, and a notification of the abnormality state 2 in which smooth motor driving is difficult and continuous driving should not be performed, in two stages depending on a frequency when the state with $\sin^2 \theta + \cos^2 \theta \neq 1$ continuously occurs. Consequently, a fail-safe property can be enhanced.

Second Embodiment

Figure 5:
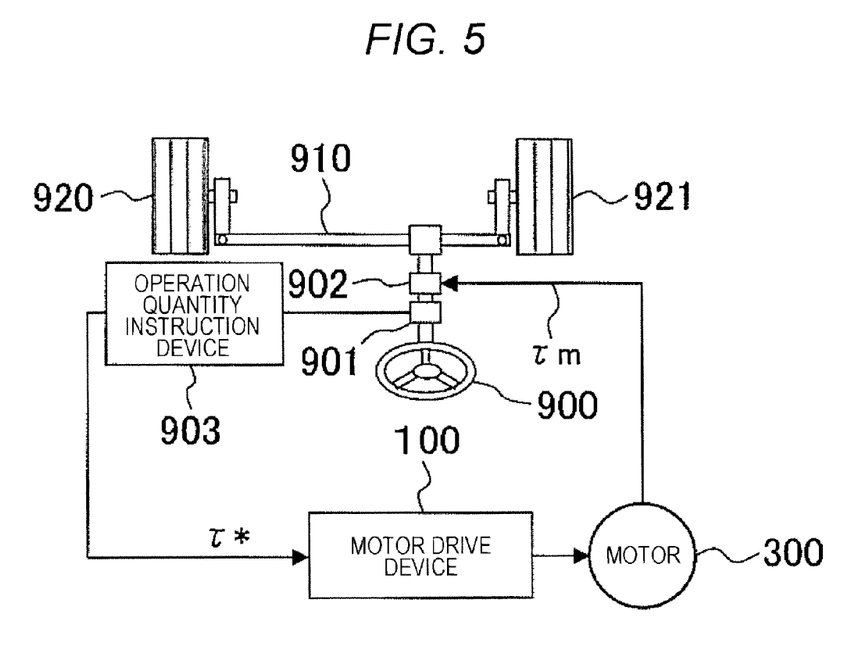
FIG. 5 is a diagram illustrating an exemplary structure of an electrically-assisted power steering device.

FIG. 5 illustrates an exemplary structure of an electrically-assisted power steering device as an exemplary applied device of the motor drive device 100. In FIG. 5, the corresponding parts to those in FIG. 1 are denoted with the same reference numerals. Various motor drive devices in the present specification can be applied to the motor drive device 100.

The electrically-assisted power steering device is configured of an electrically-assisted actuator, a handle (steering) 900, a steering detector 901, and an operation quantity instruction device 903. The electrically-assisted actuator is directed for, when a driver steers the handle 900, assisting a steering force (torque) operating about the steering shaft, thereby facilitating the driver's steering. In the present embodiment, the electrically-assisted actuator is configured of a torque transmission mechanism 902, the motor 300, and the motor drive device 100.

A torque instruction τ* for the electrically-assisted actuator (the motor drive device 100) is generated in the operation quantity instruction device 903 and is supplied to the electrically-assisted actuator.

When receiving the torque instruction τ* as an input instruction from the operation quantity instruction device 903, the motor drive device 100 controls a drive current of the motor 300 to follow the torque instruction τ*. The drive current is generated based on the torque constant and the torque instruction τ* of the motor 300.

A motor output τM output from an output shaft directly coupled to a rotator of the motor 300 transmits torque to a rack 910 of the steering device via the torque transmission mechanism 902 using a worm, wheels, a planetary gear, other deceleration mechanism or a hydraulic mechanism. The transmission of the power enables a force required for an operation of changing a steering angle of the wheels 920 and 921 to be reduced.

The amount of assist is detected by the steering detector 901 incorporated in a steering shaft. The steering detector 901 detects the amount of driver's steering (operation) as a steering angle or steering torque, and gives it to the operation quantity instruction device 903. The operation quantity instruction device 903 determines the torque instruction τ* based on the amount of steering (operation) and the amounts of states (such as vehicle speed and road state).

Figure 6:
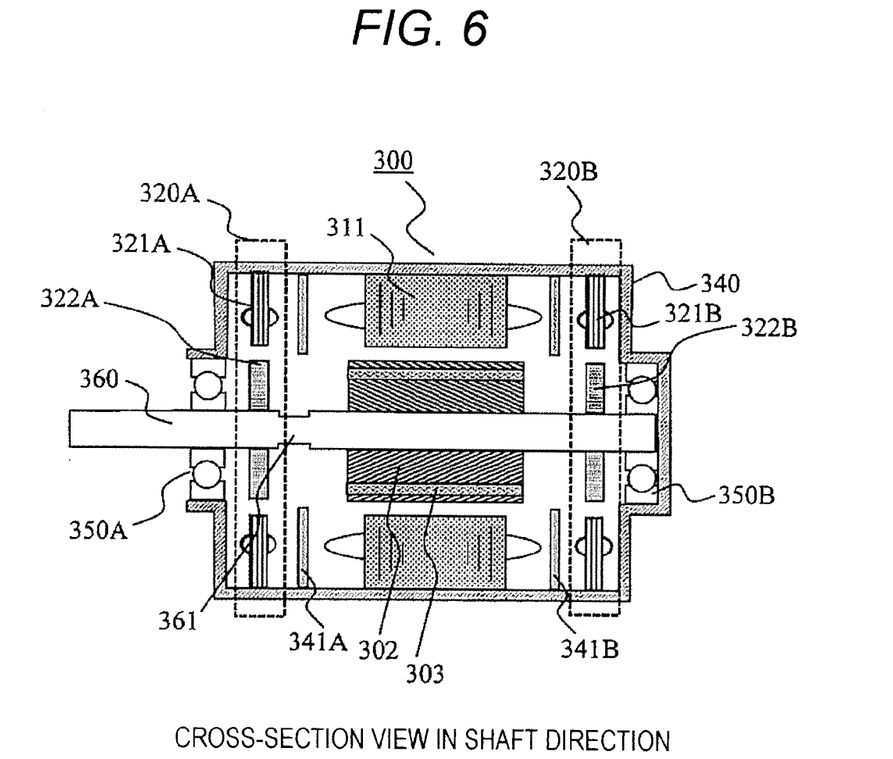
FIG. 6 is a diagram for explaining an exemplary inner structure of the motor.

FIG. 6 illustrates an exemplary internal structure of the motor 300 suitable for a combination with the motor drive device 100. FIG. 6 illustrates a cross-sectional view in the motor shaft direction of the motor 300. The motor 300 described in the present embodiment assumes a permanent magnet synchronization motor of a permanent magnet field type. Particularly, the motor 300 is assumed as a permanent magnet synchronization motor of an embedded magnet type in which a permanent magnet is embedded in a rotator iron core.

A stator 311 sequentially winds a three-phase winding wire corresponding to U, V and W on the teeth part of the stator iron core. A rotator (a rotator iron core 302, a permanent magnet 303 and a motor shaft 360) is arranged in the space inside the stator 311 via a gap. In this way, the motor 300 is an inturn type motor.

Two rotation position sensors 320A and 320B are arranged inside a motor housing 340 according to the present embodiment for fail-safe. A magnetic seal plate 341A is arranged between the stator 311 and the rotation position sensor 320A. A magnetic seal plate 341B is arranged between the stator 311 and the rotation position sensor 320B. Sensor stators 321A and 321B of the rotation position sensors 320A and 320B are fixed on the motor housing 340.

Both a sensor rotor 322A of the rotation position sensor 320A and a sensor rotor 322B of the rotation position sensor 320B are connected to the rotator (the rotator iron core 302 and the permanent magnet 303) via the motor shaft 360. The motor shaft 360 is rotatably supported by bearings 350A and 350B. A torsion bar 361 for generating torsion on the shaft and detecting torque is provided between the two rotation position sensors 320A and 320B.

When torque is applied on the motor shaft 360, the torsion bar 361 is twisted, and an angular difference occurs between the rotation positions θ detected by the two rotation position sensors 320A and 320B. Motor torque can be calculated by use of a torsion angle of the shaft and a spring constant of the shaft.

FIG. 6 illustrate a structure in which the two rotation position sensors 320A and 320B are arranged on both the right and left sides of the rotator iron core 302, but the two rotation position sensors 320A and 320B may be arranged at both sides of the torsion bar 361.

The resolvers are employed for the rotation position sensors 320A and 320B in the embodiment described above, but a Hall element or GMR sensor may be employed therefor. In these cases, an excitation signal is used for a bias voltage of the sensor element, thereby similarly enabling the detection.

[Summary]

The motor drive device 100 according to the present embodiment does not use a detection signal in the state with $\sin^2 \theta + \cos^2 \theta \neq 1$ out of two detection signals output from the rotation position sensor 320 for calculating a rotation position θ, and uses only a detection signal in the state with $\sin^2 \theta + \cos^2 \theta = 1$ to generate a rotation position θ.

Therefore, the stoppage of the motor due to a failure of the rotation position sensor 320 or the wiring line can be limited to the minimum. Further, the rotation position θ can be accurately found also while an abnormality occurs. Thus, the detection-disabled state during torque detection can be restricted to the minimum.

The motor 300 mounts the two rotation position sensors 320 thereon. Thus, the two rotation positions θ calculated from the detected wave forms of the two rotation position sensors 320 are matched thereby to confirm a presence of an abnormality. The two rotation position sensors 320 are mounted, thereby directly determining in which rotation position sensor 320 an abnormality occurs.

The motor drive device 100 to be mounted can restrict the motor stop state to the minimum. Therefore, safety required for the electrically-assisted power steering device can be further enhanced than conventional devices.

Third Embodiment

Figure 7:
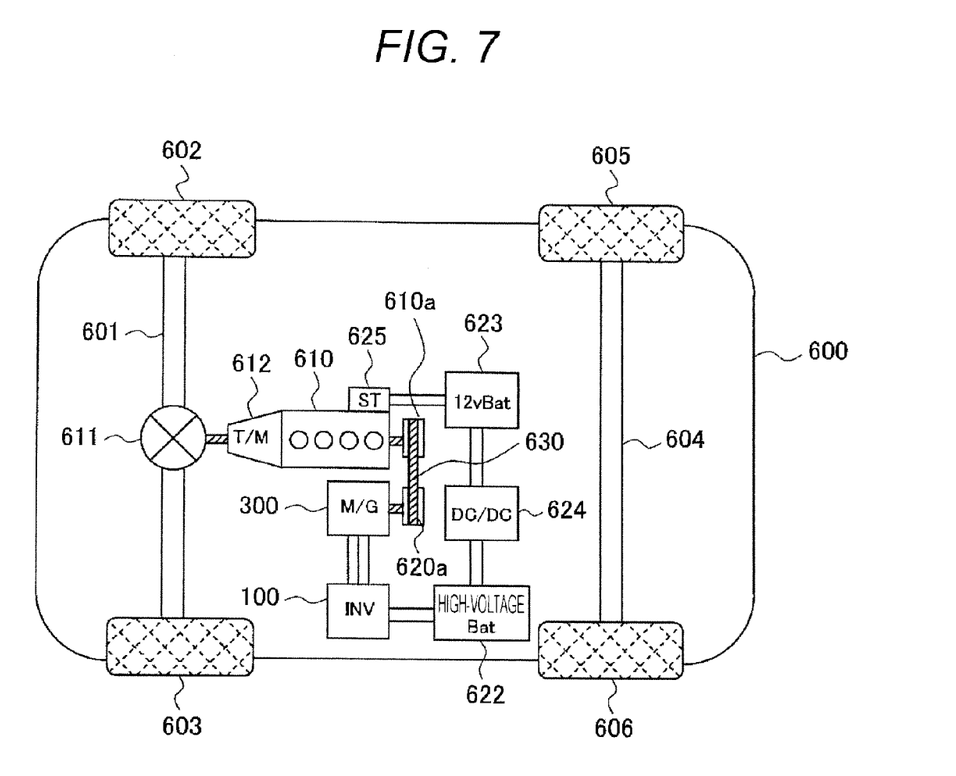
FIG. 7 is a diagram illustrating an exemplary structure of a hybrid vehicle system.

FIG. 7 illustrates an exemplary structure of a hybrid vehicle system as an exemplary applied device of the motor drive device 100. The hybrid vehicle system according to the present embodiment has a power train for applying the motor 300 as a motor/generator.

A front wheel axle 601 is rotatably supported on the front part of a vehicle 600, and front wheels 602 and 603 are attached at both ends thereof. A rear wheel axle 604 is rotatably supported on the rear part of the vehicle 600, and rear wheels 605 and 606 are attached at both ends thereof.

A differential gear 611 as a power distribution mechanism is arranged at the middle of the front wheel axle 601. A rotation drive force transmitted from an engine 610 via a transmission 612 is distributed by the differential gear 611 into the right and left parts of the front wheel axle 601. A pulley 610a attached on a crank shaft of the engine 610 and a pulley 620a provided on the rotation shaft of the motor 300 are mechanically coupled to each other via a belt 630.

Therefore, the rotation drive force of the motor 300 can be transmitted to the engine 610 while the rotation drive force of the engine 610 can be transmitted to the motor 300.

When three-phase AC power controlled in the motor drive device 100 is supplied to a stator coil of the stator configuring the motor 300, the rotator of the motor 300 rotates thereby to generate a rotation drive force according to the three-phase AC power. That is, the motor 300 operates as an electric motor controlled by the motor drive device 100. On the other hand, when the rotation drive force of the engine 610 is transmitted to rotate the rotator, an electromotive force is induced in the stator coil of the stator. In this case, the motor 300 operates as an electric motor for generating three-phase AC power.

The motor drive device 100 is a power conversion device for converting DC power supplied from a high-voltage battery 622 as a high-voltage (42V or 300V) power supply into three-phase AC power. The motor drive device 100 controls a three-phase AC current to be flowed through the stator coil of the motor 300 according to an operation instruction value and a magnetic pole position of the rotator.

The three-phase AC power generated by the motor 300 is converted into DC power by the motor drive device 100 to be used for charging the high-voltage battery 622. The high-voltage battery 622 is electrically connected to a low-voltage battery 623 via a DC/DC converter 624. The low-voltage battery 623 configures a low-voltage (14 v) power supply of the vehicle, and is used for a power supply of a stator 625, a radio, a light or the like for initially starting (cold-starting) the engine 610.

The hybrid vehicle system assumes the following operations. When the vehicle is in a stop state such as waiting at the traffic light (idle stop mode), the engine 610 is temporarily stopped. When the vehicle is restarted from the stop state, the engine 610 needs to be restarted (hot-started). At this time, the motor drive device 100 drives the motor 300 to restart the engine 610.

In the idle stop mode, when the amount of charged power of the high-voltage battery 622 is lacking or when the engine 610 is not sufficiently warmed, the engine 610 keeps being driven without being stopped.

In the idle stop mode, a drive source of accessories using the engine 610 as a drive source, such as a compressor of an air conditioner, needs to be prepared. In this case, the motor 300 is driven to drive the accessories.

Also in the acceleration mode or high-load operation mode, the motor 300 is driven to assist the driving of the engine 610. Inversely, in a charge mode in which the high-voltage battery 622 needs to be charged, the engine 610 powers on the motor 300 to charge the high-voltage battery 622. That is, power generated in braking or decelerating the vehicle is regenerated.

In the motor drive device 100 for such a vehicle, when an abnormality occurs in the rotation position sensor 320, it is desired to keep operating the motor even when the abnormality is detected.

The sensor abnormality determination unit 140 described in the first embodiment comprises a function of outputting two abnormality notifications. One is when the number of continuous detections of $Sin^2 \theta + Cos^2 \theta \neq 1$ is the predetermined number of times or less. In this case (when only the abnormality notification 1 is output), the motor drive device 100 determines that an initial abnormality occurs, and operates to continuously operate the motor 300. The other is when the state with $Sin^2 \theta + Cos^2 \theta \neq 1$ is continuously detected beyond the predetermined number of times. In this case, the motor drive device 100 operates to urgently stop the operation without permitting the motor 300 to be continuously driven.

If the driving can be kept even when an abnormality is detected, the motor drive device 100 can notify the abnormality of the motor to the driver via an external upper-level controller. The notification is used to promote the driver to rapidly stop the vehicle or to move it to a service station. If the output of the inverter 130 in the motor drive device 100 is limited as needed, the vehicle can be moved to a safe stop position or can be moved to a service station. At this time, the driving of the motor 300 can be limited depending on a frequency at which the state with $Sin^2 \theta + Cos^2 \theta \neq 1$ continuously occurs.

When the operation of the motor 300 should be urgently stopped due to a detected abnormality, a serious abnormal state leading to burning of the inverter 130 or the motor 300 can be caused. Therefore, the upper-level controller determines to urgently stop the vehicle. Therefore, finally the driving of the motor can be urgently stopped so as not to cause a failure for a passenger or the like due to an abnormality of the motor.

In this way, also when the motor 300 is applied as a motor/generator, the motor drive device 100 can provide a power train system of the vehicle for enabling to move to a safe stop position or to move to a service station.

There has been described in the above description the case in which the motor drive device 100 is applied to a hybrid vehicle system. However, the motor drive device 100 can be similarly applied to an electric vehicle.

Fourth Embodiment

Structure of Device

Figure 8:
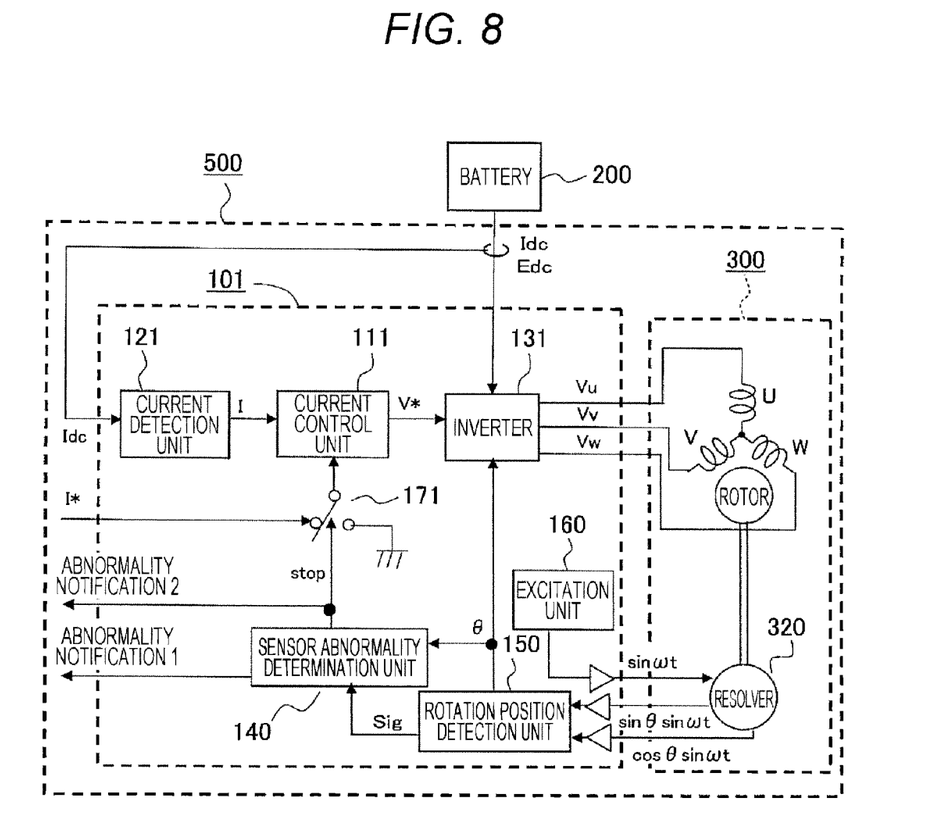
FIG. 8 is a diagram illustrating an exemplary structure of an IC-compatible motor drive device.

There will be described below a case in which the motor drive device 100 is configured as an IC. A difference between the motor device 500 illustrated in FIG. 8 and the motor device 500 illustrated in FIG. 1 lies in whether the motor drive device 100 is configured as one IC. Other structure in the motor device 500 illustrated in FIG. 8 is basically the same as the structure of the motor device 500 illustrated in FIG. 1. As described later, the detailed structure is optimized by the IC.

A motor drive device 101 illustrated in FIG. 8 comprises a current detection unit 121, a current control unit 111, an inverter 131, the sensor abnormality determination unit 140, the rotation position detection unit 150, and the excitation unit 160. The sensor abnormality determination unit 140, the rotation position detection unit 150 and the excitation unit 160 denoted with the same reference numerals as those in FIG. 1 operate in the same way as the device in FIG. 1.

The inverter 131 in the motor drive device 101 outputs a three-phase AC voltage with an analog variable voltage variable frequency to be applied to the motor 300.

The motor drive device 101 has a current control function of controlling the output of the motor 300. The current detection unit 121 according to the present embodiment monitors a DC current Idc to be supplied to the inverter 131, and detects its current value. The current control unit 111 outputs a voltage instruction (V*) to match a current detection value (I) with a current instruction value (I*). The inverter 131 amplifies and controls a semiconductor switch device of the inverter 131 and adjusts an output voltage so as to obtain three-phase analog voltage outputs having phase differences of 120 degrees and having the amplitude values given by the voltage instruction (V*).

A signal adjustment analog circuit for the input circuit of the rotation position detection unit 150 and the output circuit of the excitation unit 160 can be configured inside the IC. Therefore, a peripheral circuit can be simply configured. The abnormality notification 1 and the abnormality notification 2 output from the sensor abnormality determination unit 140 are sent to the upper-level controller. In the present embodiment, the stop signal (Stop) output in association with the abnormality notification 2 is used as a switch signal for a switch 171. The switch 171 is changed over by the switch signal so that a signal to be given to the current control unit 111 can be switched to either one of the current instruction value (I*) and the stop instruction (GND) input from the upper-level controller.

[Waveform During Abnormal Rotation of Motor]

Figure 9:
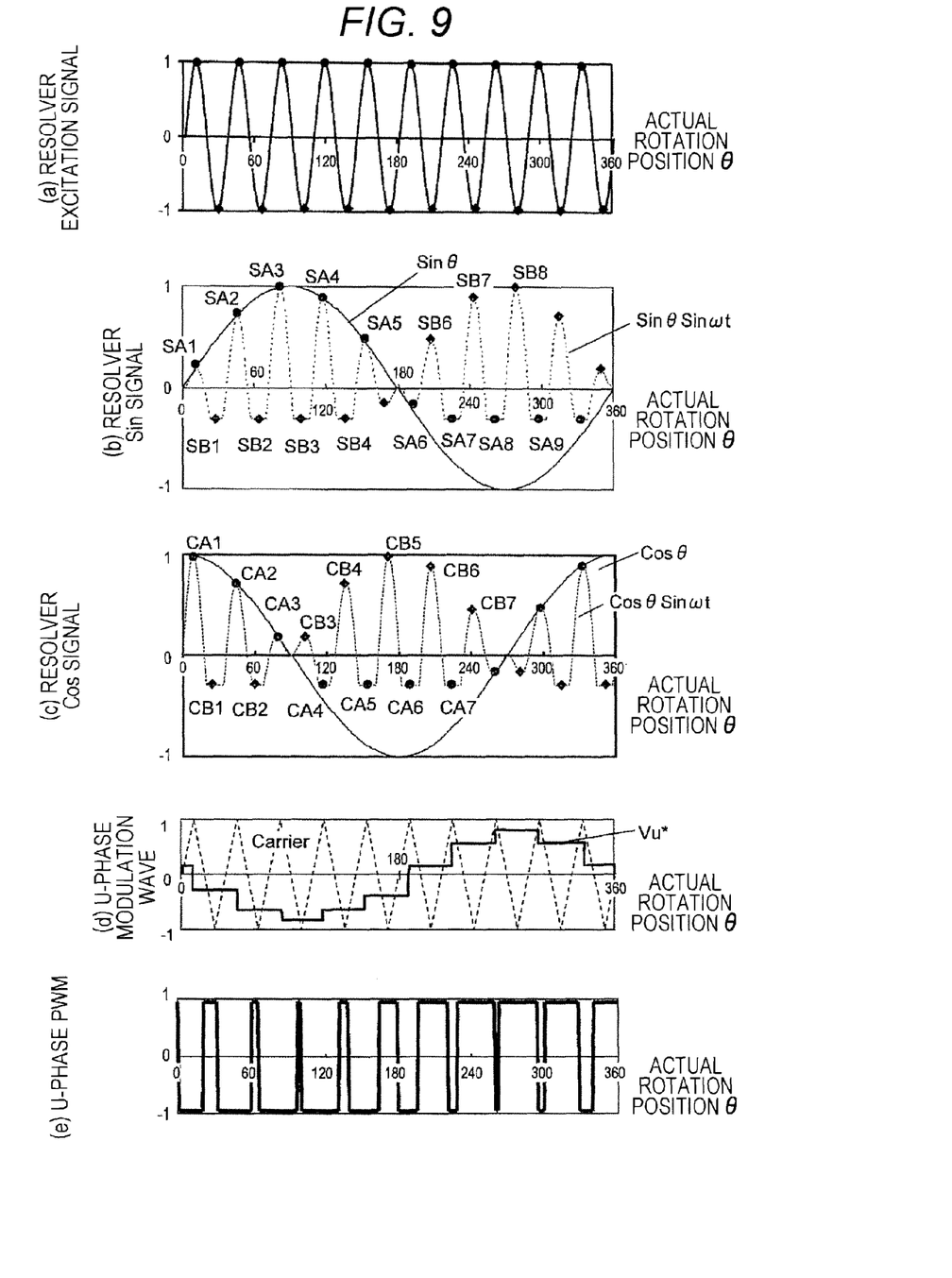
FIGS. 9(a) to 9(e) are diagrams illustrating other exemplary waveforms of detection signals containing an improper state.

In the present embodiment, an exemplary operation of the motor drive device 101 during an occurrence of an abnormal waveform different from those in the above examples will be described. FIGS. 9(*a*) to 9(*e*) illustrate exemplary appearances of other abnormal waveforms assumed in the present embodiment. A difference between FIG. 9 and FIG. 4 lies in that an abnormal waveform appears in both two-phase detection signals. In FIG. 9, both a waveform on the negative side of the resolver excitation signal Sin ωt (FIG. 9(*b*)) and a waveform on the negative side of the resolver Cos ωt (FIG. 9(*c*)) are clamped to a smaller value relative to a normal amplitude, respectively. The clamp values are different from each other.

In this case, in a period in which an actual rotation position θ is between 90 and 360 degrees, a state with $SAi^2+CAi^2 \neq 1$ is reached. In the periods in which an actual rotation position θ is between 270 and 360 degrees and between 0 and 180 degrees, a state with $SBj^2+CBj^2 \neq 1$ is reached.

Thus, the rotation position detection unit 150 according to the present embodiment adds the following calculation processings to detect the rotation position θ, and further secures a robust property. Specifically, in the period with $SAi^2+CAi^2 \neq 1$ or $SBj^2+CBj^2 \neq 1$, the rotation position θ is detected based on a result in combination of a sampling value at each sampling timing and a sampling value at a previous or subsequent sampling timing. For example, not the square sum of SA4 and CA4 but the square sum of SA4 and CB4 is calculated. CA4 is a waveform subjected to an impact of a waveform abnormality while CB4 is a normal waveform. Therefore, the value is likely to be correct.

The calculation processing enables a phase range in which $\sin^2 \theta + \cos^2 \theta = 1$ is detected to be widened. Consequently, a phase range of detection signals usable for continuously operating the motor 300 can be widened.

A combination of SA series and CB series has been described as a combination of two sampling values different by one sampling timing in the above description, but the square sum may be calculated for a combination of SE series and CA series. In this way, a determination is made as to whether the square sum is "1" not only for the combination of SA series and CB series but also for the SB series and CA series, so that if a combination of sampling values either of which takes the square sum of "1" is used, the motor 300 can be continuously driven.

A phase offset corresponding to a quarter cycle (π/2) of the resolver excitation signal Sin ωt is present between the two sampling values used for the calculation processing according to the present embodiment. Therefore, while the motor 300 is rapidly rotating, an occurrence of phase delay cannot be avoided. It is more advantageous that the motor 300 can continuously rotate.

The excitation frequency is doubled by hard logic (IC), thereby avoiding or preventing the problem of phase delay. In a combination with a PWM inverter, the rotation position detection cycle can be twice as long as the PWM pulse cycle. In this way, the oversampling technique is employed thereby to reduce an impact of noises due to magnetic disturbance generated by a motor current.

[Summary]

When the square sum of the two detection signals from the rotation position sensor 320 is not 1 ($\sin^2 \theta + \cos^2 \theta \neq 1$), the motor drive device 101 according to the present embodiment uses two sampling values offset in their phases by a quarter cycle (π/2) of the excitation signal, thereby determining whether the rotation position θ can be calculated or the continuous driving is possible. In this case, the motor 300 can keep being rotated also in a phase range in which the driving cannot be kept with the method according to the above embodiments. The motor drive device 101 according to the embodiment can be configured in an IC, thereby realizing a motor device with less space and at low cost.

Fifth Embodiment

The processing operations when other abnormal waveform is contained in two detection signals will be described below. In the following, there will be considered a case in which the amount of offset is overlapped on the resolver detection signal indicated in FIG. 4(*b*), FIG. 9(*b*) and FIG. 9(*c*).

When the amount of offset is overlapped on the resolver detection signal (such as Sin θ Sin ωt) in FIG. 3, the amount of offset can be found by the averaging of sampling values (SA1, SB1, ... ).

However, when a clamp waveform appears in part of a waveform like the resolver detection signal indicated in FIG. 4(*b*), FIG. 9(*b*) and FIG. 9(*c*), the amount of offset cannot be correctly detected even when the same calculation processing is applied.

Thus, there is employed a method for finding the amount of offset from the averaging of one cycle of Sin θ obtained from the sampling values (SA1, SA2, . . . , and SB6, SB7, . . . ) for which the status flag Sig is "0." There is employed a method for finding the amount of DC current components obtained by analyzing the sampling values by FFT (Fast Fourier Transform) as the amount of offset.

With the method, also when the offset is overlapped on the detection signal, its impact can be eliminated thereby to enhance a position detection accuracy.

Also when the amount of offset contained in cos θ exceeds the detection allowed error ±α like when the sampling value passes through the trajectory SE of FIG. 2, the amount of offset is repeatedly compensated thereby to correct the final sampling value within the detection allowed error ±α.

In this way, the computation function according to the present embodiment is mounted on the rotation position detection unit 150 so that also when the amount of offset is overlapped on a detection signal, the motor can keep being stably driven by the correction of the amount of offset.

Sixth Embodiment

Figure 10:
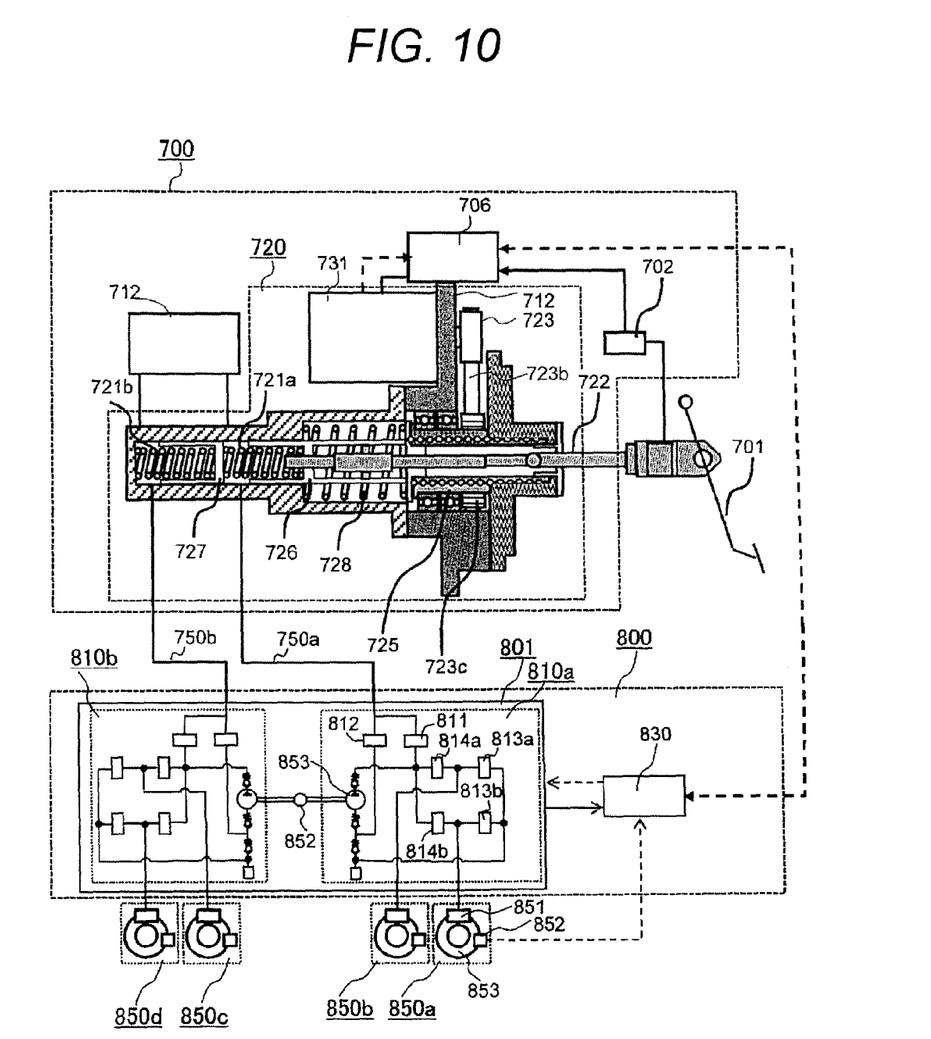
FIG. 10 is a diagram illustrating an exemplary structure of a vehicle brake device.

FIG. 10 illustrates an exemplary structure of a vehicle brake device according to the embodiment. The vehicle brake device comprises a brake assist device 700, a brake pedal 701, a boost device 800, and wheel mechanisms 850a to 850d. The brake assist device 700 comprises an assist mechanism 720, a primary liquid chamber 721a, a secondary liquid chamber 721b, and a reservoir tank 712.

An assist control unit 706 illustrated in FIG. 10 has the same functions as the motor drive device 100. That is, the assist control unit 706 has the same functional structure as the first embodiment for at least the sensor abnormality determination unit 140, the rotation position detection unit 150, and the excitation unit 160. A microcomputer of the assist control unit 706 is programmed to perform the vehicle braking operation.

A motor 731 is different from the motor 300 in that it is integrally attached to the brake assist device 700. Further, the motor 731 is different from the first embodiment in that it is integrally configured with the assist control unit 706 via a casing 712.

The amount of operations of the brake pedal 701 stepped on by the driver is input into the assist mechanism 720 via an input rod 722 to be transmitted to the primary liquid chamber 721a.

The amount of braking operations detected by a stroke sensor 702 attached on the brake pedal 701 is input into the assist control unit 706 for controlling the assist mechanism 720.

The assist control unit 706 controls the motor 731 at the rotation position θ according to the input amount of braking operations. Rotation torque of the motor 731 is transmitted to a rotation/translation conversion device 725 for converting rotation power into translation power via decelerators 723, 723b and 723c. The translation power converted in the rotation/translation conversion device 725 presses a primary piston 726 to increase a liquid pressure of the primary liquid chamber 721a, and pressurizes a secondary piston 727 to increase a liquid pressure of the secondary liquid chamber 721b.

The boost mechanism 800 is connected to the primary liquid chamber 721a and the secondary liquid chamber 721b via master pipes 750a and 750b. The boost mechanism 800 inputs a liquid pressure of an operation liquid pressurized in the primary liquid chamber 721a and the secondary liquid chamber 721b. The boost mechanism 800 transmits the input liquid pressure to the wheel mechanisms 850a to 850d in response to an instruction of a boost control unit 830. The controlling generates a brake force of the vehicle.

The assist control unit 706 controls the amount of displacement in order to adjust the amount of pressing of the primary piston 726. The amount of displacement of the primary piston 726 is detected as follows. At first, a rotation angle of the drive motor 731 is calculated based on the detection signals output from the rotation position sensor (not illustrated) provided in the motor 731, and the amount of displacement of the primary piston 726 is found based on the amount of propulsion of the rotation/translation conversion device 725.

Even when the drive motor 731 is stopped due to a failure and shaft return control of a ball screw 725 is disabled, the shaft of the ball screw 725 can be returned to an initial position by a reactive force of a return spring 728. The mechanism is employed thereby to prevent the driver's braking operation from being hindered. For example, it is possible to avoid unstable vehicle behaviors due to a brake drag.

A liquid pressure adjustment device 801 is provided with two liquid pressure adjustment mechanisms 810a and 810b for adjusting an operation liquid of two diagonal wheels among the four wheels. The mechanism structure enables the vehicle to safely stop even when a failure occurs in one mechanism. For example, the two diagonal wheel mechanisms 850a and 850b can be individually adjusted in their brake force.

The two liquid pressure adjustment mechanisms 810a and 810b operate in the same way. One liquid pressure adjustment mechanism 810a will be described in the following explanation. The liquid pressure adjustment mechanism 810a comprises a gate OUT valve 811 for controlling supply to wheel cylinders 851, a gate IN valve 812 for controlling supply to a pump, IN valves 814a and 814b for controlling an operation liquid pressure from the master pipe 750a or supply of an operation liquid to each wheel cylinder 851, OUT valves 813a and 813b for reducing a pressure of the wheel cylinders 851, pumps 853 for increasing a master pressure generated by the operation liquid pressure from the master pipe 750a, and pump motors 852 for driving the pumps 853.

For example, when a liquid pressure for antilock brake control is controlled, the boost control unit 830 processes signals from the wheel rotation sensors 853 in the wheel mechanisms 850a to 850d. For example, when a wheel lock is detected during braking, the boost control unit 830 operates the IN/OUT valves (electromagnetic) and the pumps to adjust to a liquid pressure by which each wheel is not locked. The mechanisms can be applied for controlling a liquid pressure for vehicle behavior stabilizing control.

As described above, in the vehicle brake device, the detection signals output from the rotation position sensor of the motor 731 are used for diving the motor, and are used for controlling the amount of displacement of the primary piston 726. Therefore, it is required that a stable operation is kept at high accuracy and an abnormality can be accurately detected.

In the present embodiment, similarly as the motor drive device 100 described above, when the square sum of two detection signals from the rotation position sensor is not 1 ($\sin^2 \theta + \cos^2 \theta \pm 1$), the assist control unit 706 does not use the sampling values and uses the detection signals meeting $\sin^2 \theta + \cos^2 \theta = 1$ to generate and output a voltage.

In this way, the assist control unit 706 enables the stop state of the assist mechanism due to an abnormality of the rotation position sensor or its output wiring system to be reduced to the minimum. At the same time, the amount of displacement of the primary piston 726 can be stably found.

As described above, the sensor abnormality determination unit 140 according to the present embodiment can discriminate a state in which the driving can be kept even if an initial abnormality occurs when the state with $\sin^2 \theta + \cos^2 \theta \neq 1$ is repeatedly detected from a state in which the driving is not kept and is urgently stopped when the state with $\sin^2 \theta + \cos^2 \theta \neq 1$ is continuously detected a predetermined number of times. That is, the sensor abnormality determination unit 140 can accurately detect an abnormality, and can display the detected abnormality state on an operation panel via a communication network (CAN). The driver can accurately grasp the abnormality state via the display. That is, it is possible to provide a safe vehicle brake device capable of avoiding an abnormal braking operation against a driver's intention.

Other Embodiment

The present invention is not limited to the above embodiments, and encompasses various modifications. For example, the above embodiments are directed for explaining the present invention in an understandable way. Thus, all the constituents described above are not necessarily provided. Part of an embodiment can be replaced with the structure of other embodiment and the structure of an embodiment is added with the structure of other embodiment. Part of the structure of each embodiment can be added with other structure, deleted, or replaced therewith.

The invention claimed is:

1. A motor drive device configured to
sample, at a first predetermined timing, a first detection signal and a second detection signal from a first rotation position sensor of a motor to obtain a sampling value of the first detection signal and a sampling value of the second detection signal;
detect a rotation position of the motor based on the sampling values; and
apply a voltage according to the detected rotation position to the motor,
wherein the motor drive device is configured to
apply a first voltage to the motor in a first state based on the sampling value of the first detection signal and the sampling value of the second detection signal, when a square sum of the sampling value of the first detection signal and the sampling value of the second detection signal is a predetermined value; and
apply a second voltage to the motor in a second state based on the sampling value of the first detection signal and a sampling value of the second detection signal at a second predetermined timing, when the square sum is not the predetermined value.

2. The motor drive device according to claim 1,
wherein a rotation position detection unit in the motor drive device detect is configured to detect the rotation position based on sampling values sampled twice within a predetermined cycle of an excitation frequency of the rotation position sensor.

3. The motor drive device according to claim 2,
wherein the rotation position detection unit is configured to correct magnitudes of the sampling values such that the square sum of the sampling values is a predetermined value.

4. The motor drive device according to claim 1,
wherein the first voltage is applied to the motor in the first state when the square sum of normalized sampling values of the two detection signals is 1, and the second voltage is applied to the motor in the second state when the square sum is not 1.

5. The motor drive device according to claim 1,
wherein at least one of the two detection signals has a waveform in which a positive or negative waveform of the detection signal is clamped.

6. The motor drive device according to claim 1, configured to
output a PWM-pulse-modulated output voltage; and
sample a detection signal from the rotation position sensor in synchronization with the PWM pulse.

7. The motor drive device according to claim 1,
comprising a sensor abnormality determination unit, wherein the sensor abnormality determination unit is configured to
count an appearance of the second state;
clear the count in the first state; and
when the count value is a predetermined number of times, output an abnormality notification for determining that an abnormality occurs in the rotation position sensor.

8. The motor drive device according to claim 1,
comprising a second rotation position sensor, and configured to detect the first state in which the square sum of two sampling values is a predetermined value and the second state in which the square sum is not the predetermined value per rotation position sensor, thereby to detect an abnormality.

9. The motor drive device according to claim 1,
configured to determine whether a square sum of sampling values sampled from the first and second detection signals at timings offset by a quarter cycle of an excitation frequency of the rotation position sensor is a predetermined value.

* * * * *